(12) United States Patent
Tamori et al.

(10) Patent No.: US 7,906,035 B2
(45) Date of Patent: Mar. 15, 2011

(54) EMULSION COMPOSITION

(75) Inventors: Kouji Tamori, Yokkaichi-shi (JP);
Takeshi Mogi, Yokkaichi-shi (JP);
Takuo Sone, Yokkaichi-shi (JP); Akira Nishikawa, Yokkaichi-shi (JP)

(73) Assignee: JSR Corporation, Tokyo (JP)

( * ) Notice: Subject to any disclaimer, the term of this patent is extended or adjusted under 35 U.S.C. 154(b) by 712 days.

(21) Appl. No.: 10/583,874

(22) PCT Filed: Dec. 14, 2004

(86) PCT No.: PCT/JP2004/018651
§ 371 (c)(1),
(2), (4) Date: Dec. 28, 2006

(87) PCT Pub. No.: WO2005/061629
PCT Pub. Date: Jul. 7, 2005

(65) Prior Publication Data
US 2008/0224088 A1    Sep. 18, 2008

(30) Foreign Application Priority Data
Dec. 22, 2003  (JP) ................. 2003-424417

(51) Int. Cl.
*C08F 2/32* (2006.01)
(52) U.S. Cl. ...................... 252/62.2; 524/801
(58) Field of Classification Search ............. 252/62.2; 524/801
See application file for complete search history.

(56) References Cited

U.S. PATENT DOCUMENTS

| | | | |
|---|---|---|---|
| 3,644,263 A | 2/1972 | Burke, Jr. | |
| 3,656,949 A * | 4/1972 | Honjo et al. | 430/62 |
| 5,102,580 A * | 4/1992 | Toenjes et al. | 516/163 |
| 6,346,570 B1 * | 2/2002 | Kazuyuki et al. | 524/783 |

FOREIGN PATENT DOCUMENTS

| | | |
|---|---|---|
| EP | 0 489 693 | 6/1992 |
| EP | 1 411 097 | 4/2004 |
| JP | 7 500124 | 1/1995 |
| JP | 07 242702 | 9/1995 |
| JP | 10 298206 | 11/1998 |
| JP | 2001 026695 | 1/2001 |
| JP | 2003 105046 | 4/2003 |

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

The present invention provides an emulsion composition which has been increased in sulfonic group content, yet has sufficient water resistance and has been enhanced in properties such as small resistance, film-forming property, etc. The emulsion composition contains (A) a water-based solvent, (B) an organic solvent, (C) a sulfonic group-containing polymer soluble in the component (A), and (D) a polymer soluble in the component (B) but insoluble in water. This emulsion composition is enhanced in small resistance and yet has sufficient water resistance and film-forming property.

23 Claims, No Drawings

EMULSION COMPOSITION

CROSS REFERENCE TO RELATED APPLICATION

This application is a 371 of PCT/JP04/018651, filed on Dec. 14, 2004, and claims priority of Japanese Patent Application No. 2003-424417, filed on Dec. 22, 2003.

TECHNICAL FIELD

The present invention relates to an emulsion composition containing a water-soluble polymer having sulfonic group in the molecule and a hydrophobic polymer. More particularly, the present invention relates to an emulsion composition useful as a binder, a coating material, a film and a coating material for cell separator, preferably as an electrolyte for cell, a high-molecular solid electrolyte for fuel cell, a filter, a solid capacitor, an ion-exchange membrane and an electro-conductive membrane usable in sensors, etc.

BACKGROUND ART

Sulfonic group-containing polymers are known and have been used in surfactant, emulsifier, dispersing agent, high-polymer solid electrolyte, ion-exchange membrane, etc. Meanwhile, in recent years, it has been investigated to apply the sulfonic group-containing polymers to binder resin, coating material, surface-treating agent and electrolyte for cell by utilizing the advantageous properties of the hydrophilic group (sulfonic group), i.e. dispersibility, hydrophilicity, ion-capturing property, small volume resistance (this may hereinafter be referred to as small resistance) and adhesivity to base material. In, for example, Patent Literature 1 or Patent Literature 2, it is proposed to apply a polymer (a copolymer of acrylamidesulfonic acid) to ion-exchange membrane or high-molecular electrolyte for fuel cell.

Patent Literature 1: JP-A-1999-302410
Patent Literature 2: JP-A-2002-343381

The sulfonic group-containing polymers are hydrophilic (water-soluble) owing to their hydrophilic group; therefore, when the content of hydrophilic group is higher than a certain level, the polymers are very low in water resistance and, when they have been used, for example, as a membrane material, a binder material or a coating material, the polymers swell remarkably in the presence of water, inviting problems of significant reduction in the mechanical strength of membrane, easy peeling from base material and reduction in durability. For these reasons, the content of sulfonic group has been restricted and the properties of small resistance and hydrophilicity have not been exhibited sufficiently.

Further, when there is employed a step of solvent vaporization from polymer solution, foaming appears, which becomes a defect in dried membrane.

DISCLOSURE OF THE INVENTION

The object of the present invention is to provide an emulsion composition which has been increased in sulfonic group content, yet has sufficient water resistance and has been enhanced in properties such as small resistance, film-forming property, etc.

The present invention provides an emulsion composition containing (A) a water-based solvent, (B) an organic solvent, (C) a sulfonic group-containing polymer soluble in the component (A), and (D) a polymer soluble in the component (B) but insoluble in water.

In the emulsion composition of the present invention, it is preferred that the component (D) is an amino group-containing polymer.

When the emulsion composition of the present invention is a W/O (water-in-oil) type emulsion, it is preferred that the component (B) has a vapor pressure higher than the vapor pressure of the component (A) at least at a certain temperature $T_{d1}$. Further, when the emulsion composition of the present invention is a W/O (water-in-oil) type emulsion, it is preferred that the volume of the component (C) is larger than the volume of the component (D).

Meanwhile, when the emulsion composition of the present invention is an O/W (oil-in-water) type emulsion, it is preferred that the component (B) has a vapor pressure lower than the vapor pressure of the component (A) at least at a certain temperature $T_{d2}$. Further, when the emulsion composition of the present invention is an O/W (oil-in-water) type emulsion, it is preferred that the volume of the component (C) is smaller than the volume of the component (D).

Furthermore, it is preferred that the emulsion composition of the present invention has a volume resistance after drying, of $10^{-2}$ to $10^3$ Ω·cm.

The emulsion composition of the present invention has an advantage that it is increased in sulfonic group content and enhanced in small resistance and yet has sufficient water resistance and film-forming property.

BEST MODE FOR CARRYING OUT THE INVENTION

The emulsion composition of the present invention is described in detail below.

<Water-Based Solvent>

The water-based solvent (A) [this may be referred to as component (A), in the present Description] is a solvent containing water as a major component. The water-based solvent may contain a water-soluble organic solvent as long as the organic solvent does not hinder the stability of the emulsion composition.

As to the water-soluble organic solvent, there is no particular restriction. There can be mentioned, for example, alcohols such as methanol, ethanol, isopropanol, n-butanol and the like; lactic acid esters such as methyl lactate, ethyl lactate and the like; propylene glycol monoalkyl ether acetates such as propylene glycol monomethyl ether acetate, propylene glycol monoethyl ether acetate, propylene glycol monopropyl ether acetate, propylene glycol monobutyl ether acetate and the like; cellosolves such as ethyl cellosolve, butyl cellosolve and the like; carbitols such as butyl carbitol and the like; amides such as N-dimethylformamide, N-methylacetamide, N,N-dimethylacetamide, N-methylpyrrolidone and the like; lactones such as γ-butyrolactone and the like; heterocyclic compounds such as tetrahydrofuran and the like; and sulfur-containing solvents such as dimethyl sulfoxide and the like.

The proportion of the water-soluble organic solvent contained in the component (A) is preferably 50% by weight or less, more preferably 30% by weight or less in 100% by weight of the component (A), in view of the stability of the emulsion composition.

The content of the water-based solvent (A) is ordinarily 1 to 98% by weight, preferably 5 to 95% by weight relative to 100% by weight of [(A)+(B)]. The content of the water-based solvent differs depending upon the kind of the emulsion composition; the content is ordinarily 1 to 70% by weight, preferably 5 to 50% by weight relative to 100% by weight of [(A)+(B)] when the emulsion composition is a W/O type and, when the emulsion composition is an O/W type, the content is ordinarily 30 to 98% by weight, preferably 50 to 95% by weight. When the content of the water-based solvent is 1% by weight or less, the content of the component (C) is restricted; as a result, the emulsion composition has a large resistance. When the content of the water-based solvent is more than 98% by weight, the content of the component (D) is restricted; as a result, the emulsion composition is inferior in water resistance.

<Organic Solvent>

As to the organic solvent [this may be referred to as component (B) in this Description], there is no particular restriction. There can be mentioned, for example, straight chain aliphatic hydrocarbons, branched chain aliphatic hydrocarbons and cyclic aliphatic hydrocarbons, of 6 to 12 carbon atoms; halogenated hydrocarbons of 1 to 8 carbon atoms; aromatic hydrocarbons such as toluene, xylene and the like; ketones such as 2-heptanone, 3-heptanone, 4-heptanone, cyclohexanone and the like; lactic acid esters such as n-propyl lactate, isopropyl lactate and the like; aliphatic carboxylic acid esters such as ethyl acetate, n-propyl acetate, isopropyl acetate, n-butyl acetate, isobutyl acetate, n-amyl acetate, isoamyl acetate, isopropyl propionate, n-butyl propionate, isobutyl propionate and the like; esters such as methyl 3-methoxypropionate, ethyl 3-methoxypropionate, methyl 3-ethoxypropionate, ethyl 3-ethoxypropionate, methyl pyruvate, ethyl pyruvate and the like; propylene glycol dialkyl ethers such as propylene glycol dimethyl ether, propylene glycol diethyl ether, propylene glycol dipropyl ether, propylene glycol dibutyl ether and the like; ethylene glycol monoalkyl ether acetates such as ethylene glycol monomethyl ether acetate, ethylene glycol monoethyl ether acetate and the like; propylene glycol monoalkyl ethers such as propylene glycol monomethyl ether, propylene glycol monoethyl ether, propylene glycol monopropyl ether, propylene glycol monobutyl ether and the like; and alcohols such as n-hexanol and the like.

These organic solvents (B) may be used singly or in admixture of two or more kinds.

The organic solvent (B) is preferred to be a hydrophobic organic solvent such as aliphatic hydrocarbon or the like in view of the stability of the emulsion composition. It is also preferred to be non-compatible with the water-based solvent (A). In some cases, the organic solvent (B) is preferred to be a polar solvent such as ester, ketone or the like for the dissolution of the component (D), depending upon the kind of the component (D) (which is described later).

The content of the organic solvent (B) is ordinarily 2 to 99% by weight, preferably 5 to 95% by weight relative to 100% by weight of [(A)+(B)]. The content of the organic solvent (B) differs depending upon the kind of the emulsion composition; and the content is ordinarily 30 to 99% by weight, preferably 50 to 95% by weight relative to 100% by weight of [(A)+(B)] when the emulsion composition is a W/O type and, when the emulsion composition is an O/W type, the content is ordinarily 2 to 70% by weight, preferably 5 to 50% by weight. When the content of the organic solvent (B) is 2% by weight or less, the content of the component (D) is restricted; as a result, the emulsion composition is inferior in water resistance. When the content of the organic solvent (B) is more than 98% by weight, the content of the component (C) is restricted; as a result, the emulsion composition has a large resistance.

<Sulfonic Group-Containing Polymer>

In the present invention, as to the sulfonic group-containing polymer (C) [this may be referred to as component (C) in the present Description], there is no particular restriction as long as it is soluble in the water-based solvent [the component (A)]. There can be mentioned, for example, sulfonation products of conjugated diene (co)polymers, such as sulfonation product of polybutadiene, sulfonation product of polyisoprene and the like; sulfonation products of aromatic monomer-based (co)polymers, such as sulfonation product of polystyrene, sulfonation product of styrene-butadiene copolymer, sulfonation product of hydrogenated styrene-butadiene copolymer, sulfonation product of styrene-maleic acid copolymer, sulfonation product of styrene-acrylic acid copolymer, sulfonation product of acetophenone-based ketone resin, sulfonation product of aromatic polyimide resin, sulfonation product of polyethersulfone resin and the like; (co)polymers of sulfonic group-containing monomers such as isoprenesulfonic acid, acrylamide-2-methylpropanesulfonic acid and the like; and fluorine-based polymers containing sulfonic group, typified by NAFION (a product of DuPont).

The sulfonic group-containing polymer (C) is used in an amount of preferably 10 to 90% by weight, more preferably 20 to 80% by weight relative to 100% by weight of [(C)+(D)]. When the amount of the sulfonic group-containing polymer (C) is less than 10% by weight, the emulsion composition is large in volume resistance. Meanwhile, when the amount is more than 90% by weight, the emulsion composition is inferior in water resistance.

The molecular weight of the sulfonic group-containing polymer (C) is preferably 2,000 or more, more preferably 2,000 to 500,000.

As the amount of the sulfonic group-containing polymer (C) is larger, the amount of the component (D) required for obtaining an emulsion composition containing a given amount of the sulfonic group can be larger; therefore, with a larger amount of the sulfonic group, there is an advantage that the water resistance brought about by the component (D) is obtained easily. The amount of the sulfonic group of the sulfonic group-containing polymer (C) is preferably 1 mmol/g or more, more preferably 2 mmol/g or more, most preferably 3 mmol/g or more.

As the amount of the sulfonic group contained in the emulsion composition is larger, the composition after drying has a smaller volume resistance. However, the amount of the sulfonic group in the emulsion composition after drying is preferably 0.2 to 4 mmol/g, more preferably 0.5 to 3 mmol/g for the balance with other properties such as water resistance and the like.

<Polymer Insoluble in Water But Soluble in the Organic Solvent (B)>

In the present invention, as to "the polymer (D) insoluble in water but soluble in the organic solvent (B)" [this may be referred to as component (D) in the present Description], there is no particular restriction. There can be mentioned, for example, polyethylene, polypropylene, polyisobutylene, polybutadiene, polybutene, polystyrene, polyxylene, polyvinyl chloride, polyvinylidene chloride, polyacrylonitrile, polyvinyl acetal, polyacrylate, polyvinylcarbazole, polyethylene terephthalate, polycarbonate, polyurethane, nylon, aromatic polyimide, aromatic polyamide, aromatic polyamide-imide, polyarylate, polyetherimide, polyetheretherketone, polysulfone, polyethersulfone, polyphenylene oxide, polyphenylene sulfide, fluoropolymer, and silicone polymer; and copolymer, block polymer, graft polymer, modified polymer and hydrogenated polymer thereof. When flexibility is required after film formation, there are particularly preferred hydrogenation products of diene-based polymers (e.g. hydrogenated, styrene-butadiene block copolymer), ethylene propylene rubber, fluoropolymer, silicone polymer, etc. These polymers may have sulfonic group as long as they are insoluble in water but soluble in the organic solvent (B).

In the present invention, "the polymer (D) insoluble in water but soluble in the organic solvent (B)" may have various functional groups at the terminal and/or the side chain. The polymer (D) having amino group as a functional group is particularly preferred for the stability of the emulsion composition obtained. The amount of amino group is preferably 10% or less, more preferably 2% or less of the amount of sulfonic group in the emulsion composition. The component (D) is used in an amount of preferably 10 to 90% by weight, more preferably 20 to 80% by weight relative to 100% by weight of [(C)+(D)]. When the amount of the component (D) used is less than 10% by weight, the emulsion composition is insufficient in water resistance. Meanwhile, when the amount is more than 90% by weight, the emulsion composition has a large resistance.

The molecular weight of the component (D) is preferably 5,000 or more, more preferably 10,000 to 200,000.

Incidentally, in the component (C) and the component (D) of the present invention, "soluble" indicates a case that, when a polymer (1 part by weight) and a solvent (100 parts by weight) have been mixed by means of heating, stirring or the like and then allowed to stand at 25° C., the mixture becomes a homogeneous liquid visually.

<Emulsion>

The composition of the present invention is an emulsion. To begin with, the number of solvents capable of dissolving both "the sulfonic group-containing polymer soluble in the component (A)" [the component (C)] and the polymer insoluble in water but soluble in the organic solvent (B)" [the component (D)] is small and limited. Further, when it is intended to prepare the present composition as a solution, the component (C) and the component (D) have each a narrow selection range. By preparing the present composition as an emulsion and not as a solution, the component (C) and the component (D) can each have a wide selection range and separation of the two components (C) and (D) from each other during drying can be prevented; as a result, water resistance and small resistance can be obtained.

The kind of the emulsion composition of the present invention may either of a W/O type emulsion (a water-in-oil type emulsion) and an O/W type emulsion (an oil-in-water type emulsion). Further, it may be a W/O/W type emulsion (a water-in-oil type emulsion wherein water is dispersed in oil droplets), an O/W/O type emulsion (an oil-in-water type emulsion wherein an oil is dispersed in water droplets), or a microemulsion. In the present invention, the W/O/W type emulsion is regarded as an O/W type emulsion, and the O/W/O type emulsion is regarded as a W/O type emulsion. A W/O type emulsion is preferred from the standpoint of water resistance, and an O/W type emulsion is preferred from the standpoint of small resistance. The judgement of W/O type or O/W type can be made by a test for dispersibility of emulsion in water; that is, a W/O type when separation occurs and an O/W type when dispersion occurs.

In the emulsion composition of the present invention, the size of dispersed droplets is ordinarily 10 nm to 100 µm, preferably 50 nm to 10 µm.

When, in the emulsion composition of the present invention, the following condition (1) or (2) is satisfied, foaming during drying can be prevented and a film little in defect can be obtained.

(1) The emulsion composition is a W/O type emulsion and the component (B) has a vapor pressure higher than the vapor pressure of the component (A) at least at a certain temperature $T_{d1}$.

(2) The emulsion composition is an O/W type emulsion and the component (B) has a vapor pressure lower than the vapor pressure of the component (A) at least at a certain temperature $T_{d2}$.

The vapor pressures of the component (A) and the component (B) at various temperatures are described in pp. 708 to 731 of "Handbook of Chemistry" compiled by Chemical Society of Japan. The vapor pressure of a mixed solvent can be calculated from the molar fractions and partial pressures of the individual solvents constituting the mixed solvent, based on the Dalton's Law.

When the emulsion composition of the present invention satisfies the above condition (1), a film little particularly in defect can be obtained by drying the emulsion composition at the temperature $T_{d1}$. When the emulsion composition of the present invention satisfies the above condition (2), a film little particularly in defect can be obtained by drying the emulsion composition at the temperature $T_{d2}$.

When, in the emulsion composition of the present invention, the following condition (3) or (4) is satisfied, a film satisfying, in particular, water resistance and small resistance can be obtained.

(3) The emulsion composition is a W/O type emulsion and the component (C) has a volume larger than the volume of the component (D).

(4) The emulsion composition is an O/W type emulsion and the component (C) has a volume smaller than the volume of the component (D).

Here, the volume of the component (C) or the component (D) can be calculated by dividing the weight of each component by its density.

The emulsion composition of the present invention can be produced by mixing the components (A), (B), (C) and (D) and, as necessary, a dispersing agent, etc. and then conducting agitation using paddle blades, ribbon blades, MAX Blend impeller or the like or giving rise to emulsification using a homomixer, a ultrasonic disperser, a high-pressure homogenizer, CLEARMIX (M Technic Sha), FILMICS (Tokushu Kika Kogosha) or the like.

(Dispersing Agent)

A dispersing agent may be contained in the emulsion composition of the present invention. As the dispersing agent, there can be used, for example, any dispersing agent selected from anionic surfactants such as alkylsulfate (salt), alkylarylsulfate (salt), alkylphosphate (salt), aliphatic acid (salt) and the like; cationic surfactants such as alkylamine salt, alkyl quaternary amine salt and the like; nonionic surfactants such as polyoxyethylene alkyl ether, polyoxyethylene alkyl aryl ether, block type polyether and the like; amphoteric surfactants such as carboxylic acid type (e.g. amino acid type or betaine acid type), sulfonic acid type and the like; and reactive emulsifiers having trade names such as LATEMUL S-180A and PD-104 (products of Kao Corporation), ELEMINOL JS-2 (a product of Sanyo Chemical Industries, Ltd.), AQUALON HS-10 and KH-10 (products of Daiichi Kogyo Seiyaku Co., Ltd.), ADEKA REASOAP SE-10N and SR-10 (products of Asahi Denka Kogyo K.K.), Antox MS-60 (a product of Nippon Nyukazai Co., Ltd.) and the like. In the emulsion composition of the present invention, a mixture system of an anionic surfactant and a nonionic surfactant is preferred from the standpoint of the stability of emulsion. The amount of the dispersing agent used is preferably 0.1 to 10% by weight relative to 100% by weight of [(C)+(D)].

(Crosslinking Agent)

In the present invention, there can be used, as a crosslinking agent, a compound which can react with the component (C) and/or the component (D) to form a cured material.

As such a crosslinking agent, there can be mentioned, for example:

nitrogen-containing compounds obtained by alkyl-etherifying part or the whole portion of the active methylol group of (poly)methylolmelamine, (poly)methylolglycoluril, (poly)methylolbenzoguanamine, (poly)methylolurea or the like;

phenolic resins such as novolac resin, polyhydroxystyrene or its copolymer, low-molecular phenol compound and the like; and epoxy compounds such as phenol novolac type epoxy resin, cresol novolac type epoxy resin, alicyclic epoxy resin, aliphatic epoxy resin and the like.

When carbonyl group is contained in the component (C) and/or the component (D), a polyhydrazide compound such as adipic acid dihydrazide or the like can be used as a crosslinking agent.

The crosslinking agent is used in an amount of ordinarily 0.1 to 50% by weight, preferably 1 to 40% by weight relative to 100% by weight of [(C)+(D)].

(Additives)

The emulsion composition of the present invention may contain additives such as inorganic or organic particles, adhesion aid, sensitizer, leveling agent, coloring agent and the like.

As the inorganic particles, there can be mentioned, for example, particles composed of $SrTiO_3$, $FeTiO_3$, $WO_3$, $SnO_2$, $Bi_2O_3$, $In_2O_3$, ZnO, $Fe_2O_3$, $RuO_2$, CdO, CdS, CdSe, GaP, GaAs, $CdFeO_3$, $MoS_2$, $LaRhO_3$, GaN, CdP, ZnS, ZnSe, ZnTe, $Nb_2O_5$, $ZrO_2$, InP, GaAsP, InGaAlP, AlGaAs, PbS, InAs, PbSe, InSb, $SiO_2$, $Al_2O_3$, AlGaAs, $Al(OH)_3$, $Sb_2O_5$, $Si_3N_4$, $Sn-In_2O_3$, $Sb-In_2O_3$, MgF, $CeF_3$, $CeO_2$, $3Al_2O_3 \cdot 2SiO_2$, BeO, SiC, AlN, Fe, Co, $Co-FeO_x$, $CrO_2$, $Fe_4N$, $BaTiO_3$, $BaO-Al_2O_3-SiO_2$, Ba ferrite, $SmCO_5$, $YCO_5$, $CeCO_5$, $PrCO_5$, $Sm_2CO_{17}$, $Nd_2Fe_{14}B$, $Al_4O_3$, α-Si, $SiN_4$, CoO, $Sb-SnO_2$, $MnO_2$, MnB, $Co_3O_4$, $Co_3B$, $LiTaO_3$, MgO, $MgAl_2O_4$, $BeAl_2O_4$, $ZrSiO_4$, ZnSb, PbTe, GeSi, $FeSi_2$, $CrSi_2$, $CoSi_2$, $MnSi_{1.73}$, $Mg_2Si$, β-B, BaC, BP, $TiB_2$, $ZrB_2$, $HfB_2$, $Ru_2Si_3$, $TiO_2$ (rutile type and anatase type), $TiO_3$, $PbTiO_3$, $Al_2TiO_5$, $Zn_2SiO_4$, $Zr_2SiO_4$, $2MgO_2-Al_2O_3-5SiO_2$, $Nb_2O_5$, $Li_2O-Al_2O_3-4SiO_2$, Mg ferrite, Ni ferrite, Ni—Zn ferrite, Li ferrite, Sr ferrite, Pt, Au, Ag, Fe or Cu.

The emulsion composition containing such metal oxide particles or metal particles can be made into a cured film controlled in optical properties such as refractive index and the like as well as in electrical properties such as dielectric constant, insulation, dielectric property and the like. These particles can be used per se or may be used by being loading on particles of carbon black, calcium carbonate or the like.

The diameters of these particles are preferably 10 nm to 100 µm and, when, for example, transparency is required, are preferably 10 to 200 nm, particularly preferably 10 to 100 nm. The amount of the particles used differs depending upon the application of the emulsion composition but is preferably 5 to 80 parts by weight relative to 100 parts by weight of the emulsion composition [(A)+(B)].

The emulsion composition of the present invention has a small volume resistance after drying, of preferably $10^{-2}$ to $10^3$ Ω·cm, more preferably $10^{-2}$ to $10^2$ Ω·cm. The dried material for which volume resistance is to be measured, may contain water as long as it is a solid film. In the emulsion composition of the present invention, the sulfonic group content is at least at a desired level; specifically, the present emulsion composition contains a sulfonic group preferably by 0.2 to 4 mmol/g, more preferably by 0.5 to 3 mmol/g.

The emulsion composition of the present invention can be used in various applications such as coating material (in particular, coating material for unwoven cloth for cell separator)), binder resin, high-molecular solid electrolyte film and the like. In using the present emulsion composition in various applications, other polymer may be added thereto in order to improve the properties. As the other polymer, there can be mentioned, for example, known polymers such as urethane resin, acrylic resin, polyester resin, polyamide resin, polyoxyalkylene, polyether, polystyrene, polyesteramide, polycarbonate, polyvinyl chloride, diene-based polymers (e.g. SBR and NBR) and the like.

Also, the emulsion composition of the present invention can be made into a film of good quality by using a method such as film casting, and can be suitably used for obtaining, for example, an in exchange membrane. The thus-obtained film is constituted by the components of the emulsion composition other than the solvents, i.e. the component (A) and the component (B). Similarly, the high-molecular solid electrolyte film and the filter both obtained from the present emulsion composition are as well constituted by the components of the emulsion composition other than the solvents, i.e. the component (A) and the component (B). However, the film, the high-molecular solid electrolyte film and the filter may contain water as long as their shapes are maintained.

The emulsion composition of the present invention is ordinarily used per se or as a compound containing additives. When the emulsion composition is used as a coating material, there is no particular restriction as to the method of coating; and there can be used, for example, brush coating, spraying, roll coater, flow coater, bar coater and dip coater. The thickness of the coating film differs depending upon the application of the coated material but is ordinarily 0.01 to 1,000 µm, preferably 0.05 to 500 µm in terms of as-dried thickness.

As to the base material on which the present emulsion composition is coated, there is no particular restriction. As the base material, there can be mentioned, for example, high-molecular materials such as polycarbonate resin, acrylic resin, ABS resin, polyester resin, polyethylene, polypropylene, nylon and the like; non-ferrous metals such as aluminum, copper, duralumin and the like; steel plates of stainless steel, iron and the like; glass; wood; paper; gypsum; alumina; and inorganic cured materials. As to the shape of the base material, there is no particular restriction, and there can be used a planar material, a porous material (e.g. unwoven cloth), etc.

The emulsion composition of the present invention can be used, in the form of a dried film, as a high-molecular solid electrolyte of fuel cell or the like or as a surface-modifying agent for base material. For example, by coating the present emulsion composition on a hydrophobic surface of base material, the coated material can have hydrophilicity and hygroscopicity or can maintain such properties. Also, the coated material can prevent fouling or dust collection by static electricity or the like. Further, when the present emulsion composition has been coated on a porous material such as unwoven cloth or the like, the coated material can have a capturing action, for example, for weak base (e.g. ammonia or amine) or ionic substance present in the air or water. Or, by coating the present emulsion composition on the surface of cell separator, the coated cell separator can have higher affinity toward the electrolyte of cell, which leads to enhancement of cell properties such as self-discharging property and the like. In addition, the present emulsion composition has other advantage that various particles can be finely dispersed therein and thereby the property of particles can be exhibited sufficiently.

EXAMPLES

The present invention is described below by way of Examples. However, the present invention is in no way restricted by these Examples. Incidentally, in the following Examples and Comparative Examples, "part(s)" and "%" refer to parts(s) by weight and % by weight, unless otherwise specified. Further, in the Examples, evaluations and measurements were made according to the following methods.

<Methods of Evaluations>

(Measurement of Sulfonic Group Amount)

For a solution obtained, the sulfonic group amount was measured by an acid-base titration using, as a base, an ethanol solution of potassium hydroxide and, as an indicator, phenolphthalein.

(Measurement of Density)

An aqueous solution of the component (C) or a cyclohexane solution of the component (D) was cast into a frame made of an ethylene tetrafluoride polymer (registered trade name: Teflon) so that the film formed after drying had a thickness of about 0.2 mm, and the cast solution in the frame was allowed to stand at 25° C. for 24 hours to vaporize the solvent. Then, the resulting film was heat-treated at 150° C. for 1 hour, after which a square test piece of 5 cm×5 cm was cut out from the film and measured for weight and thickness. The density of the film was calculated from the volume and weight of the test piece.

(Judgement of Kind of Emulsion)

One droplet of an emulsion composition obtained was dropped into water of 10 g. When the droplet separated from the water, the composition was judged to be a W/O type emulsion; and when the droplet dispersed in the water homogeneously, the composition was judged to be an O/W type emulsion.

(Measurement of Storage Stability)

80 g of a composition obtained was sealed tightly in a 100-cc, glass-made screw tube and allowed to stand at 25° C. for 3 days, and the system condition was observed visually. The storage stability of the composition was judged based on the following standard.

○: There was neither separation nor thickening and the initial condition was maintained.

Δ: There was observed separation of small amount or thickening.

X: Separation into two phases, or gelling of total System (Evaluation of Film-Forming Property)

A composition obtained was cast into a frame made of an ethylene tetrafluoride polymer (registered trade name: Teflon) so that the film formed after drying had a thickness of 0.2 mm, and the cast solution in the frame was allowed to stand at 25° C. for 24 hours to vaporize the solvent. Then, the resulting film was heat-treated at 150° C. for 1 hour and then aged at a relative humidity of 60% at 25° C. for 24 hours. The homogeneity of the film and the generation of foams in the film were observed visually and the film-forming property of the composition was evaluated based on the following standard.

○: The film is homogeneous and the number of foams in the film of 10 cm×10 cm is 1 or less.

Δ: The film is homogeneous and the number of foams in the film of 10 cm×10 cm is 1 to 100.

X: The film is non-homogeneous, or the number of foams in the film of 10 cm×10 cm is more than 100.

(Evaluation of Water Resistance)

A composition obtained was cast into a frame made of an ethylene tetrafluoride polymer (registered trade name: Teflon) so that the film formed after drying had a thickness of 0.2 mm, and the cast solution in the frame was allowed to stand at 25° C. for 24 hours to vaporize the solvent. Then, the resulting film was heat-treated at 150° C. for 1 hour and then aged at a relative humidity of 60% at 25° C. for 24 hours. The resulting film was immersed in hot water of 95° C. for 2 hours, followed by drying. A residual film ratio was measured from the weight change before and after immersion, and the water resistance of the composition was evaluated based on the following standard.

○: The residual film ratio is more than 95%.

Δ: The residual film ratio is 50% or more but 95% or less.

X: The residual film ratio is less than 50%.

(Measurement of Volume Resistance)

A composition obtained was cast into a frame made of an ethylene tetrafluoride polymer (registered trade name: Teflon) so that the film formed after drying had a thickness of 0.2 mm, and the cast solution in the frame was allowed to stand at 25° C. for 24 hours to vaporize the solvent. Then, the resulting film was heat-treated at 150° C. for 1 hour and then aged at a relative humidity of 60% at 25° C. for 24 hours. The resulting film was immersed in water of 25° C. for 2 hours. The resulting film was interposed between two blocks (Teflon-made) each fitted with platinum foil; the four corners were fixed to prepare a cell for measurement. To the platinum electrodes were connected an impedance meter; the AC impedance between the two platinum electrodes was measured at a frequency of 1 kHz to calculate the volume resistance of the film.

Synthesis of Sulfonic Group-Containing Polymers (C)

Synthesis Example 1

190 parts of water and 3 parts of potassium persulfate were placed in a four-necked, 1-liter separable flask equipped with a water bath, a thermometer, a mechanical stirrer and a nitrogen inlet tube. While the flask contents were stirred, the gas phase of the separable flask was purged with nitrogen. Then, when the flask contents reached 70° C. by heating, a mixture of 120 parts of water, 70 parts of 2-acrylamide-2-methylpropanesulfonic acid, 10 parts of diacetoneacrylamide and 20 parts of hydroxyethyl methacrylate, prepared in a separate container, was dropwise added into the separable flask in 2 hours. After the completion of the dropwise addition, the mixture temperature was increased to 80° C. and stirring was continued for a further 1 hour to complete a polymerization to obtain an aqueous polymer solution comprising 75% of water [a component (A)] and 25% of a sulfonic group-containing polymer (C1). The sulfonic group amount was 3.4 mmol/g and the density was 1.1 g/cm$^3$.

Synthesis Example 2

30 g of a polyethersulfone (Sumika Excel PES 5003P, a product of Sumitomo Chemical Co., Ltd.) and 300 g of concentrated sulfuric acid were placed in a three-necked, 1-liter flask. They were stirred at room temperature for 24 hours and dissolved. Thereto was dropwise added 15 g of chlorosulfonic acid to give rise to sulfonation. The reaction mixture was subjected to precipitation and purification to remove the solvent and unreacted sulfuric acid. The residue was vacuum-dried and dissolved in water to obtain an aqueous polymer solution comprising 75% of water [a component (A)] and 25% of a sulfonic group-containing polymer (C2). The sulfonic group amount was 3.7 mmol/g and the density was 1.4 g/cm$^3$.

<Polymer (D) Insoluble in Water But Soluble in an Organic Solvent (B)>

A hydrogenated, styrene-butadiene-styrene block copolymer (styrene content: 50%, molecular weight: 100,000) having no amino group at the terminal was produced by polymerization according to the method described in JP-A-2003-246817 and purified to obtain a polymer (D1). The density of the polymer was 0.9 g/cm$^3$.

A hydrogenated, styrene-butadiene-styrene block copolymer (styrene content: 50%, molecular weight: 100,000) having amino group at the terminal was produced by polymerization according to the method described in JP-A-2003-246817 and purified to obtain a polymer (D2). The density of the polymer was 0.9 g/cm$^3$.

Production and Evaluation of Emulsion Composition

Example 1

410 g of water was added to 280 g of the aqueous solution of 25% of a polymer (C1) (water: 210 g, C1: 70 g), obtained in the above Synthesis Example 1. Thereto were added 10 g of dodecylbenzenesulfonic acid and 10 g of a polyoxyethylene alkyl ether (Emulgen 147, a product of Kao Corporation) both as a dispersing agent, and 1.5 g of adipic acid dihydrazide as a crosslinking agent. The mixture was made into a solution. 30 g of the polymer (D1) was dissolved in 280 g of cyclohexane [an organic solvent (B)] to obtain a cyclohexane solution. This latter solution was added to the former solution containing the polymer (C1). The mixture was subjected to a ultrasonic treatment for 15 minutes to produce an emulsion composition. The evaluation results of the emulsion composition are shown in Table 1.

Examples 2 to 7

Emulsion compositions were obtained in the same manner as in Example 1 except that the kinds and amounts of the components (A) to (D) were changed as shown in Table 1. The evaluation results of the emulsion compositions are shown in Tables 1 and 2. In Example 7, however, no adipic acid dihydrazide was added.

Comparative Example 1

280 g of the aqueous solution of 25% of a polymer (C1), obtained in the above Synthesis Example 1 was dried at 80° C. for 24 hours to obtain 70 g of a dried polymer (C1). An operation was conducted in the same manner as in Example 1 except that no water was used, the dried polymer (C1) was used as a component (C), and a mixed solvent of 400 g of butyl cellosolve and 500 g of tetrahydrofuran was used as a component (B), to obtain a transparent homogeneous solution. The evaluation results of this solution are shown in Table 2.

TABLE 1

|  |  | Example 1 | Example 2 | Example 3 | Example 4 |
|---|---|---|---|---|---|
| Component (A) | Substance | Water | Water | Water | Water |
|  | Weight | 620 g | 620 g | 280 g | 280 g |
|  | Vapor pressure | 62 mmHg*1 | 62 mmHg*1 | 62 mmHg*1 | 62 mmHg*1 |
| Component (B) | Substance | Cyclohexane | Cyclohexane | Cyclohexane | Cyclohexane |
|  | Weight | 280 g | 280 g | 620 g | 620 g |
|  | Vapor pressure | 200 mmHg*1 | 200 mmHg*1 | 200 mmHg*1 | 200 mmHg*1 |
| Component (C) | Substance | C1 | C1 | C1 | C1 |
|  | Weight | 70 g | 70 g | 30 g | 70 g |
|  | Density | 1.1 g/cm$^3$ | 1.1 g/cm$^3$ | 1.1 g/cm$^3$ | 1.1 g/cm$^3$ |
|  | Volume | 64 cm$^3$ | 57 cm$^3$ | 57 cm$^3$ | 64 cm$^3$ |
| Component (D) | Substance | D1 | D2 | D2 | D2 |
|  | Weight | 30 g | 30 g | 70 g | 30 g |
|  | Density | 0.9 g/cm$^3$ | 0.9 g/cm$^3$ | 0.9 g/cm$^3$ | 0.9 g/cm$^3$ |
|  | Volume | 33 cm$^3$ | 33 cm$^3$ | 78 cm$^3$ | 33 cm$^3$ |
| Kind of emulsion |  | O/W type | O/W type | W/O type | W/O type |
| Storage stability |  | Δ | ○ | ○ | ○ |
| Film-forming property |  | Δ | Δ | ○ | ○ |
| Water resistance |  | Δ | Δ | ○ | ○ |
| Volume resistance |  | 92 Ω · cm | 75 Ω · cm | 740 Ω · cm | 71 Ω · cm |

*1: Vapor pressure at 42° C.

TABLE 2

|  |  | Example 5 | Example 6 | Example 7 | Comparative Example 1 |
|---|---|---|---|---|---|
| Component (A) | Substance | Water | Water | Water | Not used |
|  | Weight | 620 g | 620 g | 280 g | — |
|  | Vapor pressure | 113 mmHg*2 | 113 mmHg*2 | 62 mmHg*2 | — |
| Component (B) | Substance | Octane | Octane | Cyclohexane | Mixed solvent*3 |
|  | Weight | 280 g | 280 g | 720 g | 900 g |
|  | Vapor pressure | 60 mmHg*2 | 60 mmHg*2 | 200 mmHg*1 | — |
| Component (C) | Substance | C1 | C1 | C2 | C1 |
|  | Weight | 70 g | 30 g | 70 g | 70 g |
|  | Density | 1.1 g/cm$^3$ | 1.1 g/cm$^3$ | 1.4 g/cm$^3$ | 1.1 g/cm$^3$ |
|  | Volume | 64 cm$^3$ | 57 cm$^3$ | 50 cm$^3$ | 64 cm$^3$ |
| Component (D) | Substance | D2 | D2 | D2 | D2 |
|  | Weight | 30 g | 70 g | 30 g | 30 g |
|  | Density | 0.9 g/cm$^3$ | 0.9 g/cm$^3$ | 0.9 g/cm$^3$ | 0.9 g/cm$^3$ |

TABLE 2-continued

|  | Example 5 | Example 6 | Example 7 | Comparative Example 1 |
| --- | --- | --- | --- | --- |
| Volume | 33 cm$^3$ | 78 cm$^3$ | 33 cm$^3$ | 33 cm$^3$ |
| Kind of emulsion | O/W type | O/W type | W/O type | (Transparent solution) |
| Storage stability | ○ | ○ | ○ | ○ |
| Film-forming property | ○ | ○ | ○ | X |
| Water resistance | Δ | ○ | ○ | X |
| Volume resistance | 67 Ω · cm | 250 Ω · cm | 52 Ω · cm | 2400 Ω · cm |

*1: Vapor pressure at 42° C.
*2: Vapor pressure at 54° C.
*3: Mixed solvent of 400 g of butyl cellosolve and 500 g of tetrahydrofuran

INDUSTRIAL APPLICABILITY

The emulsion composition of the present invention can be used in various applications such as coating material (particularly, coating material for unwoven cloth for cell separator), binder resin, high-molecular solid electrolyte film and the like. The emulsion composition can be suitably used also in a film, for example, an ion-exchange membrane.

The emulsion composition of the present invention can be used as a high-molecular solid electrolyte for fuel cell or the like in the form of a dried film, or as a surface modifier for base material.

The emulsion composition of the present invention can be used in various other applications. When the present emulsion composition is applied to a porous material, etc., there can be mentioned, for example, cationic dyeing assistant for fiber, water-absorbing unwoven cloth, anti-fouling material, ion-exchange membrane, agent for making a cell separator hydrophilic, filters (e.g. air purification filter for removal of ammonia, ionic substances, etc., and water purification filter), filter for removal of leucocyte, material for removal of pollen allergen, steam-permeable material, anti-microbial material, deodorant fabric, deodorant coating, deodorant paper, anti-fogging material, moisture-controlling materials (e.g. material for prevention of dew condensation), anti-static material, anti-corrosive material, oxygen-absorbing agent, sanitary goods, and surface modification of active carbon. The present emulsion composition can also be applied to floor-polishing purpose, masking material, sizing material for paper, paper strength-increasing material, adhesive, and photographic material (e.g. silver halide photosensitive material).

Further, the emulsion composition of the present invention can be used in various applications by being combined with various functional particles. There can be mentioned, for example, ordinary coating, coating for circuit substrate, electro-conductive material, cell material (e.g. binder for solid electrolyte or binder for electrode substance), electromagnetic wave-shielding material, anti-static coating, planar heating element, electrode plate for electrochemical reaction, material for electric contact, abrasion material, anti-microbial material, sliding material, polishing material, magnetic recording medium, heat-sensitive recording material, electrochromic material, light-diffusing film, water-shielding material for communication cable, light-shielding film, sound-insulating sheet, plastic magnet, X-radiation-sensitizing screen, printing ink, agriculture chemical granules, and toner for electrophotograph. The present emulsion composition can also be applied as a coating material for surface protection, to, for example, metals (e.g. stainless steel, aluminum and copper), inorganic substances (e.g. concrete and slate), high-molecular materials (e.g. polyolefins such as polyethylene, polypropylene and the like, and polyesters such as polyethylene terephthalate and the like), wood, and paper.

The invention claimed is:

1. An emulsion composition comprising:
   (A) a water-based solvent,
   (B) a hydrophobic organic solvent,
   (C) a sulfonic group-containing polymer soluble in the component (A), and
   (D) a polymer soluble in the component (B) but insoluble in water, wherein said component (A) is present in an amount of from 1 to 98% by weight relative to 100% by weight of component (A) and component (B).

2. The emulsion composition according to claim 1, wherein the component (D) is an amino group-containing polymer.

3. The emulsion composition according to claim 1, which is a water-in-oil emulsion and wherein the component (B) has a vapor pressure higher than the vapor pressure of the component (A) at least at a certain temperature $T_{d1}$.

4. The emulsion composition according to claim 1, which is a water-in-oil emulsion and wherein a volume of the component (C) is larger than the volume of the component (D).

5. The emulsion composition according to claim 1, which is an oil-in-water emulsion and wherein the component (B) has a vapor pressure lower than the vapor pressure of the component (A) at least at a certain temperature $T_{d2}$.

6. The emulsion composition according to claim 1, which is an oil-in-water emulsion and wherein a volume of the component (C) is smaller than the volume of the component (D).

7. The emulsion composition according to claim 1, which has a volume resistance after drying, of $10^{-2}$ to $10^3$ Ω·cm.

8. A coating material comprising the emulsion composition set forth in claim 1.

9. A film obtained by a process comprising removing, from an emulsion composition set forth in claim 1, the component (A) and the component (B).

10. A high-molecular solid electrolyte obtained by a process comprising removing, from an emulsion composition set forth in claim 1, the component (A) and the component (B).

11. A filter obtained by a process comprising removing, from an emulsion composition set forth in claim 1, the component (A) and the component (B).

12. The emulsion composition according to claim 1, wherein said component (A) comprises at most 50% by weight of at least one water-soluble organic solvent selected from the group consisting of methanol, ethanol, isopropanol, n-butanol, methyl lactate, ethyl lactate, propylene glycol monomethyl ether acetate, propylene glycol monoethyl ether acetate, propylene glycol monopropyl ether acetate, propylene glycol monobutyl ether acetate, ethyl cellosolve, butyl cellosolve, butyl carbitol, N-dimethylformamide, N-methylacetamide, N,N-dimethylacetamide, N-methylpyrrolidone, γ-butyrolactone, tetrahydrofuran, and dimethyl sulfoxide.

13. The emulsion composition according to claim 1, wherein said component (B) is present in an amount of from 2 to 99% by weight relative to 100% by weight of component (A) and component (B).

14. The emulsion composition according to claim 1, wherein said component (B) is at least one member selected from the group consisting of a straight chain aliphatic hydrocarbon of 6 to 12 carbon atoms, a branched chain aliphatic hydrocarbon of 6 to 12 carbon atoms, a cyclic aliphatic hydrocarbon of 6 to 12 carbon atoms, a halogenated hydrocarbon of 1 to 8 carbon atoms, toluene, xylene 2-heptanone, 3-heptanone, 4-heptanone, cyclohexanone, n-propyl lactate, isopropyl lactate, ethyl acetate, n-propyl acetate, isopropyl acetate, n-butyl acetate, isobutyl acetate, n-amyl acetate, isoamyl acetate, isopropyl propionate, n-butyl propionate, isobutyl propionate, methyl 3-methoxypropionate, ethyl 3-methoxypropionate, methyl 3-ethoxypropinate, ethyl 3-ethoxypropionate, methyl pyruvate, ethyl pyruvate, propylene glycol dimethyl ether, propylene glycol diethyl ether, propylene glycol dipropyl ether, propylene glycol dibutyl ether, ethylene glycol monomethyl ether acetate, ethylene glycol monoethyl ether acetate, propylene glycol monomethyl ether, propylene glycol monoethyl ether, propylene glycol monopropyl ether, propylene glycol monobutyl ether, and n-hexanol.

15. The emulsion composition according to claim 1, wherein said component (C) is present in an amount of from 10 to 90% by weight relative to 100% by weight of component (C) and component (D).

16. The emulsion composition according to claim 1, wherein component (C) is at least one member selected from the group consisting of a sulfonation product of polybutadiene, a sulfonation product of polyisoprene, a sulfonation product of polystyrene, a sulfonation product of a styrene-butadiene copolymer, a sulfonation product of a hydrogenated styrene-butadiene copolymer, a sulfonation product of a styrene-maleic acid copolymer, a sulfonation product of a styrene-acrylic acid copolymer, a sulfonation product of a ketone resin of acetophenone, a sulfonation product of an aromatic polyimide resin, a sulfonation product of a polyethersulfone resin, and the like; a (co)polymer of isoprenesulfonic acid, a (co)polymer of acrylamide-2-methylpropanesulfonic acid, and a fluorinated polymer having a sulfonic group.

17. The emulsion composition according to claim 1, wherein said component (C) has a molecular weight of least 2 000 or more.

18. The emulsion composition according to claim 1, wherein said component (D) is present in an amount of from 10 to 90% by weight relative to 100% by weight of component (C) and component (D).

19. The emulsion composition according to claim 1, wherein said component (D) is at least one member selected from the group consisting of polyethylene, polypropylene, polyisobutylene, polybutadiene, polybutene, polystyrene, polyxylene, polyvinyl chloride, polyvinylidene chloride, polyacrylonitrile, polyvinyl acetal, polyacrylate, polyvinylcarbazole, polyethylene terephthalate, polycarbonate, polyurethane, nylon, aromatic polyimide, aromatic polyamide, aromatic polyamideimide, polyarylate, polyetherimide, polyetheretherketone, polysulfone, polyethersulfone, polyphenylene oxide, polyphenylene sulfide, fluoropolymer, a silicone polymer, a copolymer thereof, a block polymer thereof, a graft polymer thereof, a modified polymer thereof, and a hydrogenated polymer thereof.

20. The emulsion composition according to claim 1, wherein said sulfonic group-containing polymer has a sulfonic group content of 1 mmol/g or more.

21. The emulsion composition according to claim 1, wherein said sulfonic group-containing polymer has a sulfonic group content of 3 mmol/g or more.

22. The film according to claim 9, wherein said sulfonic group-containing polymer has a sulfonic group content of from 0.2 to 4 mmol/g.

23. The emulsion composition according to claim 20, having a residual film ratio of at least 50% when in the form of a film, said residual film ratio measured by:
    casting the emulsion composition in an ethylene tetrafluoride polymer cast;
    drying a film in the cast at 25° C. for a period of 24 hours;
    heat-treating said film at a temperature of 150° C. for a period of 1 hour;
    aging said film at a relative humidity of 60% at 25° C. for a period of 24 hours;
    immersing said film in 95° C. water for a period of 2 hours;
    weighing said film prior to said immersing; and
    weighing said film after said immersing,
    wherein said residual film ratio is the weight change determined from said weighing said film prior to said immersing and said weighing said film after said immersing.

* * * * *